United States Patent [19]

Noehren et al.

[11] 4,244,677

[45] Jan. 13, 1981

[54] CROSS-BEAM HELICOPTER ROTOR WITH READILY REPLACEABLE SNUBBER

[75] Inventors: William L. Noehren, Huntington; Donald L. Ferris, Newtown; Peter C. Ogle, Woodbridge, all of Conn.

[73] Assignee: United Technologies Corporation, Hartford, Conn.

[21] Appl. No.: 924,110

[22] Filed: Jul. 12, 1978

[51] Int. Cl.² ............ B64C 27/38; B64C 27/72
[52] U.S. Cl. .................. 416/134 A; 416/140; 416/141
[58] Field of Search .......... 416/134 A, 138 A, 140 R, 416/140 A, 141

[56] References Cited

U.S. PATENT DOCUMENTS

| 3,700,352 | 10/1972 | Gorndt | 416/134 A |
|---|---|---|---|
| 4,053,258 | 10/1977 | Mouille | 416/141 |
| 4,087,203 | 5/1978 | Ferris | 416/134 A |
| 4,093,400 | 6/1978 | Rybicki | 416/134 A |

*Primary Examiner*—John J. Vrablik
*Attorney, Agent, or Firm*—Vernon F. Hauschild

[57] ABSTRACT

A cross-beam helicopter rotor in which the torque tube enveloping the flexible spar is supported in relation thereto by an elastomeric primary snubber which is readily replaceable in the field and which utilizes a snubber retainer plate bonded to the spar with an elastomer layer of selected shape factor so that the retainer plate remains adhered to the spar while accommodating all blade and spar pitch and flapping motions and so that the retainer plate elastomer layer is substantially more durable than the elastomer layers of the primary snubber. This primary snubber may be used in combination with an auxiliary snubber.

9 Claims, 4 Drawing Figures

CROSS-BEAM HELICOPTER ROTOR WITH READILY REPLACEABLE SNUBBER

BACKGROUND OF THE INVENTION

1. Field of the Invention

This invention relates to helicopter cross-beam rotors and more particular to such rotors which have a replaceable primary snubber between the flexible spar and the enveloping torque tube, and more particularly to such rotors in which the primary snubber is connected to the spar in slip-fit engagement with the retainer member which is bonded to the spar with an elastomer layer of selected shape factor so as to cause the retainer to remain bonded to the spar throughout all motions of the flexible spar, and which primary snubber is used in combination with an auxiliary snubber.

2. Description of the Prior Art

In the prior art, such snubbers have been bonded directly to the flexible spar. This has proved to be undesirable because replacement thereof in the field can actually cause damage to the spar per se, which is the main load carrying element in the helicopter rotor, thereby threatening structural integrity of the rotor. Snubbers have also been used in the prior art between the blade and the hub, such as in U.S. Pat. No. 4,053,258 to Mouille entitled "Tail-Rotor Arrangement for Rotor Crafts," and the disadvantage of this blade-to-hub snubber, as opposed to our blade-to-spar snubber, is that the blade-to-hub snubber causes higher cyclic flapwise bending stresses to occur in the torque tube member as the spar flexes in flight, whereas, the blade-to-spar snubber is mounted outboard of the point of maximum spar bending curvature thereby reducing torque tube deflections and stresses. Further, our laminated metal shim/elastomer snubber has the following advantages over the solid rubber snubber of Mouille: (1) higher compression strength and improved fatigue life since bulging of the elastomer at the free edges is greatly reduced in the laminated construction because the thin rubber layers permitted by the laminated construction have a high shape factor, and (2) higher compression stiffness due to the higher shape factor attainable with the laminated construction. This higher stiffness aids rotor stability and reduces lost control motion due to snubber deflections caused the pitch control loads.

SUMMARY OF INVENTION

A primary object of the present invention is to provide a readily replaceable elastomeric snubber between the flexible spar and the blade or torque tube of a flexible, cross-beam helicopter rotor, which may be replaced in the field without damaging the spar and which is attached to the spar so as to be operatively connected therethrough throughout all spar flexing motions and the spar shapes caused by such motions during all blade maneuvers including pitch change and flapping.

In accordance with the present invention, the inner plate or race of the elastomeric snubber is connected to the spar surface by a retainer member in which the inner plate is slidingly engaged, and which retainer member is connected to the spar through an elastomer layer of selected shape factor bonded to the spar so as to maintain adherence of the retainer to the spar throughout all blade and spar motions.

In accordance with the further aspects of the present invention, this readily removeable and replaceable primary snubber may be used in combination with an auxiliary snubber which serves to protect the structural integrity of the blade should the primary snubber malfunction.

Other objects and advantages of the present invention may be seen by referring to the following description and claims, read in conjunction with the accompanying drawings.

DESCRIPTION OF THE PREFERRED EMBODIMENT

Figure 1:
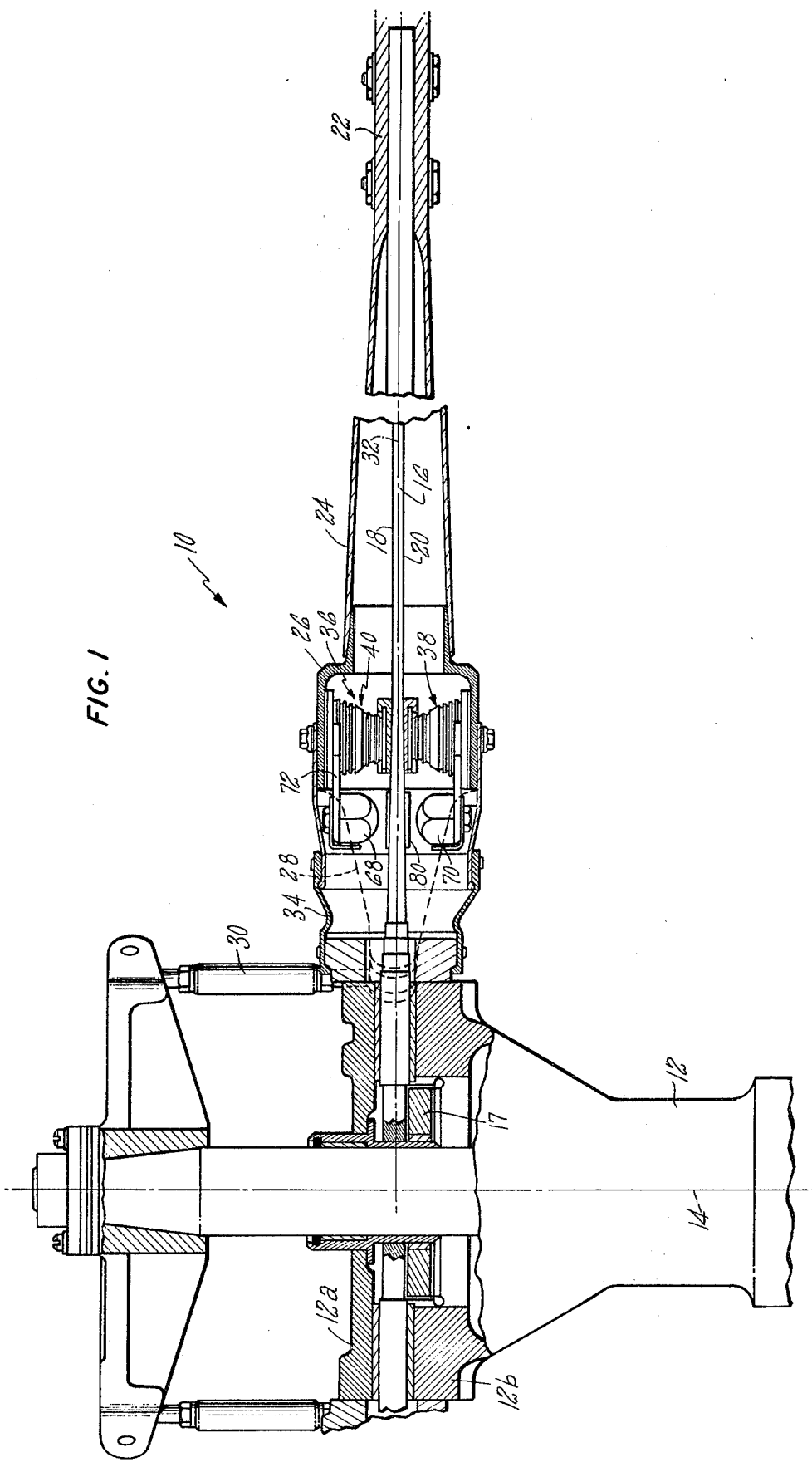
FIG. 1 is a partial cross-sectional side view showing of a helicopter cross-beam rotor using our primary and auxiliary snubbers.

Referring to FIG. 1 we see helicopter cross-beam rotor 10 which includes hub member 12 mounted from the fuselage (not shown) for rotation about axis of rotation 14. Flexible spar 16, which is preferably one piece in construction and fabricated primarily of a plurality of fibers of high tensile strength extending radially therealong and bonded to one another so as to be rectangular in cross-section throughout at least a portion of its span, thereby defining a flat top surface 18 and a bottom flat surface 20 in that area. Spar 16 is supported at its center by a bolting connection between hub sections 12a and 12b and extends laterally or radially on opposite sides thereof to be connected to helicopter blade 22 at opposite ends of the spar. A second spar 17 may extend perpendicular to spar 16 and also support blades at its ends to form a four bladed rotor. Blade 22 includes or is connected in conventional fashion to torque tube 24 at its inner or root end. Torque tube 24, in turn, preferably includes or is connected in conventional fashion to pitch horn 26, from which horn 28 extends and is actuatably connected to reciprocating pitch change control rod 30 to cause blade 22 to change pitch about feathering axis 32. Flexible boot member 34 connects the pitch horn 26 to hub 12 and is preferably used to seal off the opening therebetween to prevent any foreign matter from being entrapped or damaging the internal components of the blade 22 or hub 12.

Primary snubber set 36, which preferably includes upper snubber or snubber portion 40 and lower snubber or snubber portion 38, extends between spar surfaces 18 and 20 to the inner surfaces of the torque tube or pitch horn 26 and serves to support the torque tube in proper relationship with respect to spar 16. Snubber set 36 transfers push rod loads from the pitch horn through the elastomeric snubber and into the spar, and also controls pitch-flap coupling which occurs when the spar moves in flapping motion. Rotor 10 may be of the type more fully described in U.S. Pat. No. 3,874,820 to Fenaughty, U.S. Pat. No. 4,008,980 to Noehren and Hibyan, in U.S. Pat. No. 3,484,174 to McCoubrey, Canadian Pat. No. 951,301 to Arcidiocono, and in the Noehren and Fenaughty paper entitled "Composite Bearingless Tail Rotor for UTTAS" presented to the American Helicopter Society in May 1976 and published by that Society.

Primary snubber set 36 is of the elastomeric type and includes identical upper and lower snubbers 40 and 38.

Upper snubber 40 only will be described since it is identical with lower snubber 38.

Figure 2:
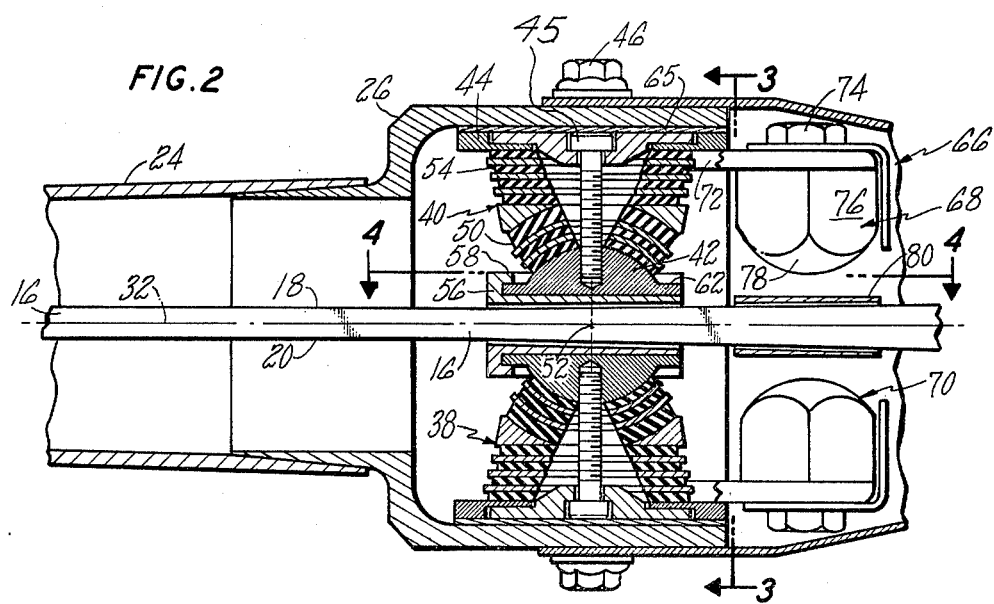
FIG. 2 is an enlarged showing, comparable to FIG. 1, of the snubbers in greater detail.
Figure 3:
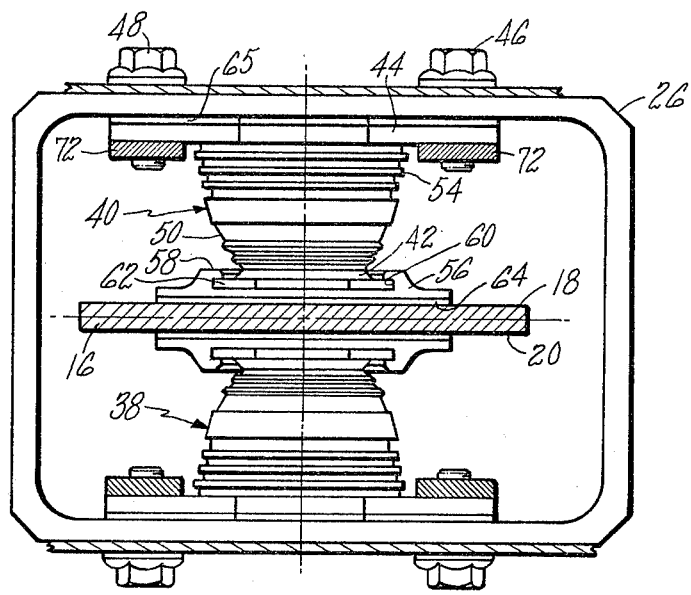
FIG. 3 is a showing along line 3—3 of FIG. 2.
Figure 4:
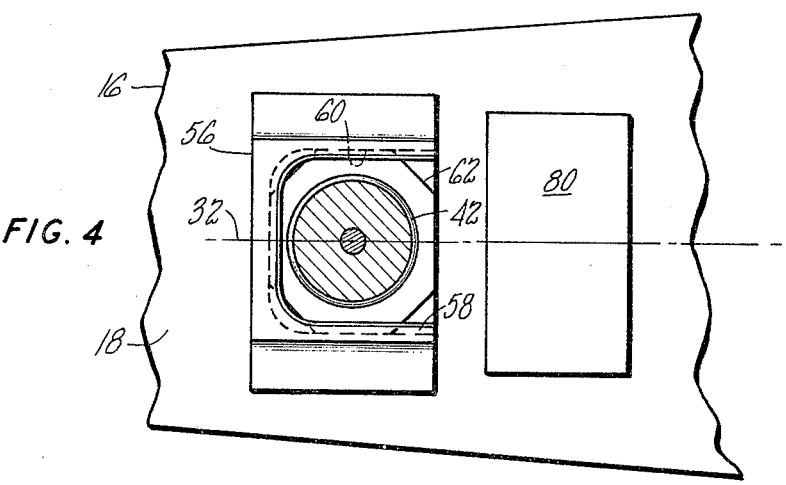
FIG. 4 is a showing, with the snubbers removed, along line 4—4 of FIG. 2.

Referring to FIGS. 2-4 we see that primary upper snubber 40 includes inner race or plate member 42, which is preferably of spherical shape, and outer race or plate 44, which is connected to the inner surface of pitch horn 26 by nut and bolt connection members 46 and 48 so as to readily attach plate 44 to pitch horn 26 in quick connect-disconnect fashion. Specifically, outer plate 44 is connected or disconnected to pitch horn 26 utilizing the following operation. Primary snubber portion 40 is preferably of the elastomeric bearing variety comprising a stack of alternate layers of laminates of elastomer and metal or other nonextensible material, sandwiched between and bonded to inner and outer plates 42 and 44 and each other. The inner portion 50 of the snubber 40 is preferably a spherical elastomeric bearing concentric about point 52 on feathering axis 32 so as to accommodate blade pitch and flap change, and outer portion 54 is preferably flat in construction to accommodate in-plane, lead-lag motions. Similar construction is shown in U.S. Pat. No. 4,087,203 to Ferris. Spacer 65 is used to shim the gap between plate 44 and pitch horn 26 to accommodate manufacturing tolerance built up so that elastomeric primary snubber 40 is properly loaded. Primary upper snubber 40 is precompressed prior to installation to a predetermined height by screw shown in FIG. 2. Screw 45 compresses inner race or plate member 42 toward outer race or plate 44. A shim member 65 is selected by the difference between gap of horn 26 (inner surface) and surface of retainer 26, and the predetermined height of snubber 40. Snubber 40 is then slid into retainer 56 and fastened through shim 65 to horn member 26 by bolts 46 and 48. The screw shown in FIG. 2 is then removed. Thus snubber 40 is installed in a precompressed state.

Inner plate or race member 42 is slidably received in retainer 56 which has U-shaped flange member 58 extending therefrom so as to define U-shaped groove 60, into which the correspondingly shaped foot 62 of plate member 42 is received in sliding engagement. It will be seen that snubber inner flange member 42 may be slid into retainer member 56 from the hub or radially inboard side thereof and, in view of the U-shape of retainer flange 58 is prevented thereby from moving radially or laterally outwardly toward blade 22 or circumferentially with respect to spar 16. Accordingly, to assemble primary snubber portion 40 into position, portion 40 is slid forwardly, or radially outwardly, into retainer groove 60 so that inner plate 42 is restrained from moving radially outwardly and so that, with connecting members 46 and 48 joining outer plate 44 to pitch horn member 26, the primary upper elastomeric snubber 40 is retained in operable position. To remove primary snubber portion 40 for replacement thereof, bolt means 46 and 48 are removed and snubber portion 40 slid radially inwardly.

It is a very important teaching of our invention that retainer 56 be retained in position with respect to spar 16 throughout the full operation of blade 22 and spar 16, and throughout the full range of motion thereof, including pitch change and flapping motion which will present both concave and convex and combination of each shapes in surfaces 18 and 20 to which retainer 56 must continue to be joined. This has been accomplished by bonding retainer 56 to spar surfaces 18 and 20 using an elastomer layer 64 of selected durometer, thickness and bonding area between spar and retainer so that the elastomer layer has a high shape factor of approximately 15 to 20. The formula for determining shape factor for such an elastomer layer loaded in compression is, shape factor = compression area ÷ bulge area.

Another reason for the high shape factor requirement for the elastomer layer 64 joining retainer 56 to spar surface 18 is that it is essential that elastomer layer 64 be more durable than the elastomer layers of the primary snubber 40. If the elastomer layer 64 were too thin, it could not perform its spar flexibility accommodation function and if it were too thick, its durability would be no better than that of the primary snubber elastomer layers.

The reason that it is deemed desirable to mount primary snubber 40 so as to be readily replaceable is that experience has shown that while an elastomer primary snubber has many excellent qualities to perform its intended functions, flexibility thereof increases rapidly after a certain period of operation and it is therefore necessary to periodically replace the elastomeric snubber. This replacement requirement normally takes place in the field and it is therefore essential that the elastomeric snubber be easily replaceable by mechanics in the field, not require return of the helicopter, rotor or blade to the factory, and not do damage to the structural parts of the blades during the replacement, for example, the blade spar 16. As best shown in FIG. 2, snubbers 38 and 40 are preferably hollow to aid in the molding of the snubber and precompressing it for installation. Primary snubber 40 may be used in combination with auxiliary snubber 66, which could be readily inboard or outboard thereof, and which comprises identical upper and lower portions 68 and 70, the former of which will now be described. Auxiliary snubber 68 may be supported in any convenient fashion, for example, by means of U-shaped frame member 72 which is connected at its opposite ends by conventional bolt members to primary snubber outer plate 44. Bolt member 74 extends through frame member 72 and into Nylon member 76 to support member 76 in spaced relationship with respect to spar surface 18. It is important that Nylon member 76 present spherical surface 78 to the spar and that nylon member 76 be made of a low friction nylon, such as Nylatron manufactured by The Polymer Corporation, Reading, Pa. 19603. Auxiliary snubber inner surface 78 is made spherical to accommodate pitch change, flapping and lead-lag motions of spar 16 without contact between the auxiliary snubber and the spar. Auxiliary snubber 68 is preferably supported so as to maintain a gap of about 0.070 to 0.075 inches from stainless steel protective pad 80, which is connected to surface 18 of spar 16 elastomerically in the same manner as is retainer 56, by an elastomer having an equally high shape factor in view of the durometer, thickness, and contact area as described supra in connection with retainer 56 and its elastomer layer 64. Protective plate 80 is utilized to protect surface 18 of spar 16 from direct contact with redundant snubber 68 since such direct contact could do damage to the spar and in particular to the high strength fiber members extending radially therethrough. Protective plate 80 serves to distribute the load imposed by the snubber against the spar over a greater surface area than would be the case if the spherical snubber contacted the spar surface directly.

With auxiliary snubbers 68 and 70 so mounted, the structural integrity of rotor is maintained should primary snubber 36 commence to deteriorate in operation. The redundant snubbers would then serve the function of controlling motion between the spar and the torque tube and of sharing part of the primary snubber load so as to decrease its rate of deterioration, while at the same time permitting sufficient motion to create warning vibrations to the operator so that the primary snubber 40 may be replaced.

To determine the optimum gap between the auxiliary snubber portions 68 and 70 and the spar protective plates 80, we whirl tested rotor 10 with the primary snubber 36 removed and with various clearances between the auxiliary snubber 68-70 and the spar plates 80 and found that while rotor stresses and vibrations increased tolerably and within acceptable ranges up to a given clearance, that both stresses and vibrations increased very rapidly when the auxiliary snubber-to-spar gap clearance exceeded this 0.070 to 0.075 inches acceptable limit. The gap between the auxiliary snubber and the spar is achieved by shimming between the auxiliary snubber retainer plate 72 and the auxiliary snubber nylon member 76. It is essential to have a gap between the auxiliary snubber 68 and 70 and the spar protective plates 80 so as to permit normal spar motions without contact between the redundant snubbers and the spar. Less clearance than the optimum gap of 0.070 to 0.075 inches would cause the auxiliary snubber spherical surface to wear away prematurely and ruin its effectiveness. It has further been our experience that contact between the spar and the auxiliary snubber takes place more frequently as the primary snubber begins to breakdown and hence it has been possible to determine the condition of the primary snubber by inspecting the gap between the auxiliary snubber and the spar protective plate.

We wish it to be understood that we do not desire to be limited to the exact details of construction shown and described, for obvious modifications will occur to a person skilled in the art.

We claim:

1. A helicopter rotor of the cross-beam variety including:
   (1) a hub member adapted to be mounted for rotation about an axis of rotation,
   (2) a flexible, one-piece spar member supported by said hub member and extending radially on opposite sides thereof, and being fabricated of high strength fiber members extending in parallel relationship radially therealong and bonded together so as to form a flexible spar with high tensile strength and shaped to be rectangular in cross section and present flap upper and lower surfaces,
   (3) a blade member connected to the opposite ends of said spar member,
   (4) a torque tube connected at its outboard end to said spar member and extending inwardly in spaced relation to and enveloping said spar member,
   (5) a primary snubber member positioned at the inner end of said torque tube and comprising a top portion extending between said spar upper surface and the inner surface of said torque tube and a lower portion extending between said spar flat lower surface and the inner surface of said torque tube, each of said primary snubber portions comprising:
      (a) an outer plate member,
      (b) an inner plate member, and
      (c) alternate laminates of elastomer and non-extensible material sandwiched therebetween,
   (6) quick connect-disconnect means connecting said outer plate member to said torque tube,
   (7) retainer means connected to said spar surface and engaging said inner plate member so that said inner plate member is restrained from moving both laterally and radially outwardly with respect to the spar but so that said inner plate member is movable radially inwardly with respect to said spar toward said hub member,
   (8) means connecting said retainer means to said spar surface comprising an elastomer layer of selected durometer and thickness and bonded to the retainer means and the spar surface over a selected area so that the elastomer is of specified shape factor.

2. A helicopter rotor of the cross-beam variety including:
   (1) a hub member adapted to be mounted for rotation about an axis of rotation,
   (2) a flexible, one-piece spar member supported by said hub member and extending radially on opposite sides thereof, and being fabricated of high strength fiber members extending in parallel relationship radially therealong and bonded together so as to form a flexible spar with high tensile strength and shaped to be rectangular in cross section and present flat upper and lower surfaces,
   (3) a blade member connected to the opposite ends of said spar member,
   (4) a torque tube connected at its outboard end to said spar member and extending inwardly in spaced relation to and enveloping said spar member,
   (5) a primary snubber member positioned at the inner end of said torque tube and comprising a top portion extending between said spar upper surface and the inner surface of said torque tube and a lower portion extending between said spar flat lower surface and the inner surface of said torque tube, each of said primary snubber portions comprising:
      (a) an outer plate member,
      (b) an inner plate member, and
      (c) alternate laminates of elastomer and non-extensible material sandwiched therebetween,
   (6) quick connect-disconnect means connecting said outer plate member to said torque tube,
   (7) a retainer member shaped to receive said inner plate member in mating engagement for retention thereof so that said inner plate member is restrained from moving both circumferentially and radially outwardly with respect to the retainer member but so that said inner plate member is movable radially inwardly with respect to said retainer member toward said hub member,
   (8) means connecting said retainer member to said spar surface comprising an elastomer layer of selected durometer and thickness and bonded to the retainer member and the spar surface over a selected area so that the elastomer is of specified shape factor, and
   (9) wherein said retainer member is shaped to present a U-shaped slot open toward the hub member, and wherein said primary snubber inner plate member is shaped to have a peripheral flange which may be slid into said retainer member from a position radially inwardly thereof and for retention thereby against motion in a radially outward and circumferential directions.

3. A helicopter rotor according to claim 2 wherein said elastomer layer shape factor is 15 to 20.

4. A helicopter rotor according to claim 3 wherein said primary snubber outer plate is connected to said torque tube by bolt members.

5. A helicopter rotor according to claim 4 and including auxiliary snubber means supported to be positioned on opposite sides of said spar top and bottom flat surfaces and shaped to present a spherical surface in spaced relation to said top and bottom surfaces so as to control the position and motion of the spar member in case of primary snubber malfunction.

6. A helicopter rotor according to claim 5 wherein said snubber spherical surfaces are spaced about 0.070 to 0.075 inches from the top and bottom surfaces of said spar member when said spar member is unloaded.

7. A helicopter rotor according to claim 6 wherein said auxiliary snubber is made of low friction, nylon material.

8. A helicopter rotor according to claim 7 and including wear plates bonded to the top and bottom surfaces of said spar in a selected location to be contacted by said auxiliary snubber member spherical members.

9. A helicopter rotor according to claim 8 wherein said wear plates are bonded to said spar surfaces by a layer of elastomer of selected durometer, thickness and area of adhesion so that the elastomeric layer is of specified shape factor.

* * * * *